(12) United States Patent
Pachler et al.

(10) Patent No.: US 12,545,116 B2
(45) Date of Patent: Feb. 10, 2026

(54) CURRENT COLLECTOR AND METHOD FOR OPERATION

(71) Applicant: SCHUNK TRANSIT SYSTEMS GMBH, Nussdorf am Haunsberg (AT)

(72) Inventors: Alexander Pachler, Salzburg (AT); Dominik Pascal Arnold, Heltersberg (DE)

(73) Assignee: SCHUNK TRANSIT SYSTEMS GMBH, Nussdorf am Haunsberg (AT)

( * ) Notice: Subject to any disclaimer, the term of this patent is extended or adjusted under 35 U.S.C. 154(b) by 100 days.

(21) Appl. No.: 18/691,619

(22) PCT Filed: Sep. 13, 2021

(86) PCT No.: PCT/EP2021/075078
§ 371 (c)(1),
(2) Date: Mar. 13, 2024

(87) PCT Pub. No.: WO2023/036443
PCT Pub. Date: Mar. 16, 2023

(65) Prior Publication Data
US 2025/0360796 A1 Nov. 27, 2025

(51) Int. Cl.
*B60L 5/04* (2006.01)
(52) U.S. Cl.
CPC .............. *B60L 5/04* (2013.01); *B60L 2200/26* (2013.01)
(58) Field of Classification Search
CPC .................................. B60L 5/04; B60L 2200/26
See application file for complete search history.

(56) References Cited

U.S. PATENT DOCUMENTS 6,418,397 B1 * 7/2002 Brand ................... B60L 5/28
701/19
2020/0369155 A1 11/2020 Lindqvist

FOREIGN PATENT DOCUMENTS

| | | |
|---|---|---|
| DE | 19725906 C1 | 2/1999 |
| JP | 2002-504997 A | 2/2002 |
| JP | 2008-185458 A | 8/2008 |
| KR | 20190004173 A | 1/2019 |
| KR | 102276634 B1 | 7/2021 |
| WO | 9856610 A1 | 12/1998 |

* cited by examiner

*Primary Examiner* — Xiao En Mo
(74) *Attorney, Agent, or Firm* — Dickinson Wright PLLC; Andrew D. Dorisio; Nicholas P. Coleman (57) ABSTRACT

A method for operating a current collector on a roof of a rail vehicle for transferring energy thereto from a contact line of an overhead contact line, the current collector having a positioning device for moving a sliding piece relative to the contact line and pressing it against the contact line in a sliding contact position using a pressing force produced by a drive mechanism and a spring mechanism. The current collector has a measuring unit with a measuring device, at least two sensors of a sensor apparatus of the measuring device being disposed on the positioning device or the sliding piece, measured values being registered in the sliding contact position in each case by the sensors. The measured values are processed by a processing apparatus, which correlates the measured values and determines a characteristic value describing an operating state of the current collector or the overhead contact line.

25 Claims, 4 Drawing Sheets

Fig. 7

# CURRENT COLLECTOR AND METHOD FOR OPERATION

TECHNICAL FIELD

The invention relates to a current collector and a method for operating a current collector, which is disposed on a roof of a rail vehicle, for transferring energy from a contact line of an overhead contact line to the rail vehicle, the current collector comprising a positioning device having a sliding piece disposed thereon, the positioning device moving the sliding piece relative to the contact line and pressing it against the contact line in a sliding contact position using a pressing force in order to establish a sliding contact, the pressing force being produced on the sliding piece by means of a drive mechanism and a spring mechanism of the positioning device.

BACKGROUND

In order to supply power to rail-bound but also non-rail-bound vehicles via a contact line, sliding pieces made of carbon are often used. Sliding pieces of this kind are always subject to wear by abrasion of the carbon material. When using sliding pieces of this kind, for examples on locomotives of trains, it is necessary to swap them before a final wear limit has been reached in order to prevent dangerous operating states, defects or malfunctions. While an emergency shut-down function is commonly integrated in sliding pieces, which causes the sliding piece to be lowered when a final wear degree has been reached or even before then if the sliding piece is damaged, for example broken, further supply in energy and thus further operation of the vehicle no longer being possible due to this sliding piece once an emergency shut down of this kind has been initiated. To avoid this kind of situation, the degree of wear of the sliding pieces is inspected in regular intervals. These inspections are commonly carried out by personnel, albeit only at high labor exertion as the sliding pieces are disposed on a roof of a vehicle, such as a locomotive, and specific safety measures must be upheld owing to the high voltage coursing through the contact line. Inspections of this kind are thus performed in certain intervals in rail depots. To circumvent these elaborate inspections, partially automated wear monitoring systems are known which can signal when a wear limit has been reached. Specification WO 2014/173798 A2 discloses a sliding piece having a wear indication marking which can be detected by means of an infrared camera. When passing a camera positioned on a route, the sliding piece can be registered by means of the camera and the wear indication marking can be identified via image processing. In dependence of an appearance of the wear indication marking, conclusions can be drawn regarding a degree of wear of the sliding piece. A disadvantage is that no permanent of a degree of wear of the sliding piece is possible and that technical efforts for establishing such monitoring in a rail network are comparatively large and consequently costly.

Furthermore, the positioning device often comprises a rocker arm or rocker or a pivot guide or a pantograph via any of which the sliding piece is pressed against the contact line by means of the spring mechanism and consequently the required pressing force is applied for establishing a safe sliding contact. The spring mechanism can be formed by bellows, a tension spring and/or a compression spring. The spring mechanism compensates movements of the rail vehicle and a changing course of the contact line. Depending on a relative distance of a route of the rail vehicle to the contact line and on a speed of the rail vehicle, strongly fluctuating forces can act on the sliding piece, whereby the sliding piece is heavily strained. Vibration can also be induced in the sliding piece itself and/or in the positioning device. When the sliding piece is lifted from the contact line, an electric arc can arise, whereby wear of the sliding piece is increased by electric loss of material. This overall results in increased efforts for servicing the current collector and swapping the sliding piece which is dependent on a composition of the overhead contact line. It is therefore known to test track sections of overhead contact lines in the frame of test runs with a rail vehicle. For this purpose, the rail vehicle specifically provided for this purpose has to be equipped with measurement technology intended specifically for this purpose, such as cameras for taking images of the contact line. Inspections of this kind are therefore costly and merely allow a snapshot of an operating state of the overhead contact line.

SUMMARY

The object of the invention at hand is therefore to propose a method for operating a current collector as well as a current collector and a monitoring system having a current collector, any of which allow improved operation.

The method according to the invention for operating a current collector which is disposed on a roof of a rail vehicle, for transferring energy from a contact line of an overhead contact line to the rail vehicle is performed using a current collector, the current collector comprising a positioning device having a sliding piece disposed thereon, the positioning device moving the sliding piece relative to the contact line and pressing it against the contact line in a sliding contact position using a pressing force in order to establish a sliding contact, the pressing force being produced on the sliding piece by means of a drive mechanism and a spring mechanism of the positioning device, the current collector having a measuring unit having a measuring device, at least two sensors of a sensor apparatus of the measuring device being disposed on the positioning device and/or the sliding piece, measured values being registered in each case in the sliding contact position by means of the sensors, the measured values being processed by means of a processing apparatus of the measuring device, the processing apparatus putting the measured values into correlation with each other and determining a characteristic value describing an operating state of the current collector and/or the overhead contact line.

The sliding piece comprises a contacting element which is commonly made of carbon and can abut against a contact line and can thus establish an electric connection thereto. This contact element is held by a sliding piece carrier which in turn is fixed on an element known as a pantograph or a rocker arm. This pantograph or rocker arm forms a positioning device for the sliding piece and thus in conjunction with the sliding piece an entity known as a current collector. The current collector itself is disposed on a roof of a vehicle in order to establish contact with the contact line over the vehicle.

With the method according to the invention, it is intended that the current collector comprises a measuring unit having a measuring device, which itself has a sensor apparatus having at least two sensors. The sensors are disposed on the positioning device and/or the sliding piece although they can generally be disposed anywhere on the current collector. By means of the sensor apparatus or rather the sensors, different measured values of the positioning device and/or the sliding piece can be registered in the sliding contact position in each case. These measured values are physical measured variables which have a direct operative relationship with the positioning device, the sliding piece and the overhead contact line and are subject to change during operation of the current collector. By means of the processing apparatus, the measured values and/or the measured variables measured using the corresponding sensor are processed and a characteristic value is determined which is suitable for describing an operating state of the current collector and/or the overhead contact wire. It is essential that the processing apparatus puts the corresponding measured values of the sensors in correlation with each other in order to determine the characteristic value. This makes it possible to obtain further information on an operating state of the current collector and/or the overhead contact wire in the form of the characteristic value. The processing apparatus accordingly carries out a calculation with at least two measured values from at least two sensors. Depending on the type of sensors, the measured values can be of the same or different nature. For instance, a first sensor can measure a vertical movement of the positioning device and a second sensor can measure a vertical movement of the sliding piece. The processing apparatus puts these two measured values in correlation, for example by the processing apparatus taking a connection between both measured values into account when calculating the characteristic value, such as a bump in a route relative to a flat contact line or vice versa. If the vertical movements of the sliding piece and the positioning device are identical, the movement is induced by the course of the contact line and not by the route.

The characteristic value can be a parametrized value, a characteristic, a characteristic number or a dataset. The characteristic value can also be contained within a dataset. In particular, it is intended to digitally process the measured values by means of the processing apparatus in order to thus obtain a characteristic value which can be digitally processed. The processing apparatus consequently is formed by at least one digital electronic circuit which can process analog and/or digital signals of the sensor. The processing apparatus can also be a programmable logic controller (PLC), an integrated circuit (IC) or a computer, for example.

Since the processing apparatus determines the characteristic value which is suitable for describing the operating state of the current collector and/or the overhead contact line, it becomes possible to determine the operating state of the current collector and/or the overhead contact line, monitor it and/or impact the operating state of the current collector. An operating state is a structural, variable property of the current collector and the overhead contact line which is present during operation. Since the operating state of the current collector significantly depends on a composition and/or an operating state of the route, the characteristic value can also describe the operating state of the route. Overall, the current collector, the overhead contact line and the route can be specifically serviced without having to observe the regular maintenance intervals or having to carry out test runs with a rail vehicle. Overall, it thus becomes possible to operate a current collector and an overhead contact line at less cost, meaning a rail vehicle can be operated more economically.

Consequently, an angular position of the positioning device, an acceleration, a speed, a rotation, a frequency, a temperature, an illuminance, a force, a current, a voltage, an electric resistance, a distance, a mass, an air pressure, a sound, wear and/or a position are continuously or discontinuously registered and processed as a measured value. An acceleration can be easily measured using a gyrometer. Using the angular position of the positioning device, a deflection of a rocker or a pantograph can be measured at a pivot point of the rocker or the pantograph in relation to the rail vehicle. For this purpose, a rotary potentiometer at the pivot point or a different suitable sensor, such as a gyrometer for measuring an angle of inclination or a rotation, can be used. A temperature can be measured using a temperature sensor on the positioning device or on a rocker or on a pantograph or on the sliding piece, whereby it can be established, for example, whether there is a risk of the contact line being frozen over. An illuminance can be measured using an optical sensor or a camera, which forms the sensor. This allows assessing irregularities on a surface of the contact line or electric arcs. A force can be detected by means of a strain gauge, a force sensor, a pressure sensor or the like. For instance, a pressing force can be measured in dependence of an air pressure of a cylinder of the positioning device. A current and a voltage can be measured using an amperemeter and a voltmeter, respectively, as a sensor. A resistance can be determined from the current and the voltage and be a measure for contact quality as well as being able to provide information on a state of wear of the sliding piece. For instance, a quality of a power transferal between the sliding piece and the contact line can be determined. The mass can also be determined by means of a force sensor. An air pressure can be measured at a pair of bellows or a pressure cylinder in order to muster the pressing force. A position of the current collector can be easily determined via a satellite navigation system, such as GPS. A sound can be measured via a microphone, meaning noises can be evaluated as measured values. Wear can be measured using a sensor by means of which a height and/or thickness of a sliding piece can be measured. The measured values can be registered and processed continuously. It is also possible to register and process the measured values discontinuously, for example at predetermined times or at certain occasions.

It is particularly advantageous if at least one acceleration sensor, which can be disposed on the sliding piece and/or on the positioning device, is used as a sensor. The sensor can be a rotary or translational acceleration sensor or vibration sensor which can be used for measuring a movement or rather acceleration of the positioning device and/or the sliding piece. For instance, a movement of the sliding piece can be detected on the contact line by means of the acceleration sensor, conclusions regarding a shape of the contact line and/or the sliding piece being able to be drawn from the movement. Thus, for instance, a ledge in the course of the contact line, which can cause the sliding piece to be lifted off the contact line, can be easily detected. Special test runs or on-site inspections of the overhead contact line for detecting malfunctions of this kind are thus no longer required. Furthermore, a change of the sliding piece as a result of wear or abrasion causes a geometric change of the sliding piece. This can result in a difference between a new and a worn sliding piece. Since the sliding piece is commonly in contact with the contact line during operation of the rail vehicle and is brushed by it, the processing apparatus can derive a change of the sliding piece from a movement of the sliding piece in conjunction with another measured value, such as a movement of the positioning device. It can also be intended that movement profiles of new and worn sliding pieces are stored in the processing device, the processing device being able to carry out a comparison and being able to detect a state of wear and consumption of the sliding piece. This wear can be output in the form of the characteristic value.

Moreover, breakage or deformation of the sliding piece as well as damage to the overhead contact line can be easily detected.

Furthermore, at least one sensor can be used which can be disposed within the sliding piece, on the sliding piece, on a mounting bearing of the sliding piece or on a rocker of the positioning device holding the sliding piece. Consequently, the sensor can be disposed in a recess of the sliding piece or a contact element of the sliding piece, for example. Furthermore, the sensor can also be directly mounted on the sliding piece or a sliding piece holder of the sliding piece. Alternatively, the vibration sensor can also be disposed on the mounting bearing of the sliding piece. The sliding piece can comprise, for example, two mounting bearings, by means of which the sliding piece is mounted on the positioning device. In addition, another sliding piece, which also has a sensor, can be disposed on the rocker, meaning this sliding piece can also be monitored by means of the measuring unit. Equally, it is possible for the sensor device to comprise more than two sensors, which are disposed on the previously mentioned points in order to be able to more precisely determine the characteristic value.

The processing apparatus can analyze the measured values while the sliding piece is guided along the contact line. Consequently, the processing apparatus can perform this analysis during operation of the rail vehicle.

In the scope of this invention, it can also be intended that measured values are analyzed while the rail vehicle is not in operation, for example at a train station or a stop. In particular, characteristic values on an operating state of the overhead contact line can preferably only be obtained when the sliding piece is guided along the contact line.

The processing apparatus can store the measured values from sensors and/or the characteristic values at regular intervals, when change occurs or continuously. Accordingly, it can be intended that the measured values and/or the characteristic values are only registered and stored when the values change in order to keep the amount of data low. Alternatively, it is also possible to intend to continuously register and store data. By storing the measured values and/or the characteristic values, the processing of data becomes possible even after data has been registered. For instance, measured values can be registered while the rail vehicle is in motion, the characteristic value(s) being able to be determined at a depot while the rail vehicle is being serviced. For instance, a state of an overhead contact line along a route of the rail vehicle can be determined after a run.

An actuator can be controlled by means of a control device of the measuring device in order to actuate the positioning device, the actuation of the positioning device being able to be regulated by means of a regulating apparatus of the control device according to a measured value and/or a characteristic value. The drive mechanism can comprise the actuator, which can be connected in such a manner to a rocker unit or the rocker of the positioning device that the sliding piece can be moved between the sliding contact position and a storing position via a linear movement of the actuator. The actuator can be formed via a linear drive or a pneumatic or hydraulic cylinder or bellows, for example. It can also be intended that the pressing force is changed via the actuator or the actuator produces the pressing force. The actuator forms the spring mechanism or is combined therewith. The control device can now receive signals or rathe measured values and/or characteristic values from the measuring device and use them for regulating the drive mechanism by means of the regulating apparatus. If, for example, the processing apparatus detects a breakage of the sliding piece, the sliding piece can be pivoted to a storing position on the rail vehicle by means of the actuator. Moreover, it is possible to regulate the pressing force via the actuator. Generally, a control device of this kind can also be provided as a component group of the rail vehicle independently of the measuring device.

The pressing force can be regulated via the regulating apparatus as a function of the measured values and/or the characteristic values. For instance, the pressing force can be produced so as to be generally constant, independently of an angular position and a movement of the positioning apparatus. Thus, a lifting of the sliding piece from the contact line as a result of bumps or other influences can be mostly prevented. The processing apparatus can output a characteristic value to the control device, for example, after the sliding piece has been accelerated away from the contact line, the control device being able to exert a counterforce, which prevents a lifting of the sliding piece, on a rocker via the regulating apparatus and/or the actuator. Nevertheless, it is also possible to regulate the pressing force such that the sliding piece does not become worn faster as a result of an increased pressing force. The pressing force can then be reduced in contrast if an improved electric contact with the contact line can be established.

The measuring device can transmit the measured values and/or the characteristic values to an evaluation unit, the measured values and/or the characteristic values being able to be stored in a databank of the evaluation unit and/or be processed by means of an evaluation device of the evaluation unit. The evaluation unit can consequently comprise the databank and the evaluation device. The evaluation unit can thus serve for collecting and processing measured values and/or characteristic values and be formed by a computer. For instance, a result of an evaluation can be indicated or output to a user using the evaluation device. The evaluation unit can have a functional range which exceeds the functional range of the processing apparatus. Generally, however, it is also possible to integrate the processing apparatus in the evaluation unit and vice versa. Equally, an evaluation unit of this kind can be provided as a component group of the rail vehicle independently of the current collector.

The measured values and/or the characteristic values of the measuring device can be transmitted to the evaluation unit and/or the control device via a data connection by means of a transmitting apparatus, the evaluation unit and/or the control unit being able to be spaced apart from the measuring unit or be integrated in the measuring unit. If the control device and/or the evaluation unit is integrated in the measuring unit, the data connection can be simply established via a digital line link. In this case, it is also possible to install parts of the measuring device, such as the processing apparatus and the control device as well as the evaluation unit, in different positions on the rail vehicle. When transmitting the measured values and/or the characteristic values, data can be exchanged, for example based on a transmission protocol. The data connection can be established continuously, in regular intervals or based on certain events. Overall, it is thus possible to collect and evaluate data collected by the measuring device. Different options for evaluation allow an analysis of certain states and events, whereby an operation of the current collector and the overhead contact line and the rail vehicle can be optimized.

The data connection can be established via an external data network. For this purpose, the data connection can be established via a mobile network, WiFi, a satellite connection, the Internet or any other radio standard, either used individually or in combination with each other. If the evaluation unit and/or the control device are spaced apart from the measuring unit, the latter can also be disposed in a fixed manner outside of and away from the rail vehicle, for example in a building. In particular, it becomes possible to monitor and/or control a function of the current collector on the rail vehicle, without this task having to be carried out on the rail vehicle itself by a person.

The evaluation unit can process measured values and/or characteristic values from measuring units of several current collectors. Thus, the evaluation unit can process measured values and/or characteristic values of several current collectors disposed on an individual rail vehicle. By comparing the measured values and/or characteristic values of the current collectors, precision of a measurement and/or monitoring can be further increased. Moreover, characteristic values of current collectors can be processed using the evaluation unit, the current collectors being disposed on different rail vehicles. This also allows significantly improving the precision of measurements and monitoring of the rail vehicles of the corresponding overhead contact line. Among other things, a current and constantly changing status image of a route network and the rail vehicles operating thereon can be obtained. A resulting optimization of an operating state can reduce the operating costs significantly. Regular and frequent inspections of the infrastructure and the rail vehicles are no longer required to this extent and a vehicle safety during operation is increased significantly. Specific test runs can also be forgone.

By means of a user unit, a data connection to the evaluation unit and/or the measuring unit can be established, the measured values and/or the characteristic values being able to be transmitted and output to the user unit. The user unit can be a computer which is independent of the evaluation unit and/or the measuring unit. This computer can be a stationary computer, a mobile radio unit or the like, by means of which another data connection for exchanging data with the evaluation unit and/or the measuring unit can be established. The data can be exchanged, for example, via an external data network, such as the Internet. Thus, data prepared using the evaluation unit or rather measured values and/or characteristic values processed using the evaluation device can be made available to another user circle. The evaluation unit can be formed via a server using a software, for example, which transmits the information contained in the databank of the evaluation unit to the user unit. The transmission can be made up of the provision of a web page having selected information, such as a current state of wear of the sliding piece.

The processing apparatus or the evaluation unit can evaluate a temporal sequence of the measured values and/or the characteristic values and determine a state of wear of the current collector and/or the overhead contact line while taking a time-dependent component relevant to wear and/or a component dependent on measured variables into account. Hence, not only a conclusion can be drawn regarding a current state of wear but it can be determined approximately at which point in time a sliding piece or a contact line will be worn, for example. This makes it possible to precisely determine and temporally optimize a servicing interval for the current collector and/or the overhead contact line, for example by adapting to the actual state of the current collector and/or the overhead contact line. Moreover, the temporal sequence allows determining at which point in time certain events occurred. If events repeat, a pattern can be derived therefrom. For instance, a poorer electric contact or an increased wear can be determined when traversing a specific track section.

A vibration of the sliding piece can be registered by means of the sensor apparatus, the processing apparatus or the evaluation unit being able to determine a state of wear of the sliding piece and/or the overhead contact line. When the sliding piece is worn, a shape, in particular a height, of the sliding piece can be changed, the change in shape also being able to change the vibration behavior of the sliding piece. For instance, an eigenfrequency and/or a resonance frequency of the sliding piece and/or the positioning device can be determined as a vibration using the processing apparatus. By means of the processing apparatus, a degree of wear of the sliding piece, the positioning device and/or the overhead contact line can be determined from the vibration. If the vibration behavior is changed in conjunction with increased abrasion of material of the sliding piece and/or of a component of the positioning or the contact line, conclusions can be drawn on a degree of wear of the sliding piece, the positioning device and/or the contact line from this change. Thus, for example, it is not only possible to determine whether the sliding piece is new or entirely worn but also to which degree the sliding piece is worn. The shape of the sliding piece is essentially determined by an abrasion of the carbon material of the contact element which occurred at the sliding piece. From this, a difference in height of the sliding piece or of the contact element between a new and a worn sliding piece can essentially be obtained. As the sliding piece is constantly either contacted or brushed by the contact line along a length of the sliding piece during operation of a rail vehicle, the sliding piece can be worn irregularly in relation to a length of the sliding piece. This means that the sliding piece can be more strongly worn at a center of the sliding piece than at its edges. Depending on a state of the overhead contact line, grooves can be formed on the sliding piece. A height of the sliding piece can consequently change irregularly according to a usage, which impacts the shape of the sliding piece. Furthermore, the constant alteration between contacting and brushing along the length of the sliding piece by the contact line can be registered during a run of a rail vehicle, a state of the sliding piece being able to be determined therefrom.

The processing device can calculate the shape by means of the finite element method. It can be intended, for instance, that the processing device calculates a possible shape of the sliding piece from the vibration behavior based on the finite element method using a computer model. In this scenario, the previously described, possible abrasion of the sliding piece can in particular be taken into account. It is thus possible to more precisely determine a state of wear of the sliding piece.

The processing apparatus or the evaluation unit can determine the following from the operating state: an electric arc at the sliding piece and/or the contact line, a zigzagging course of the contact line, a frozen over contact line and/or defects of the contact line. The electric arc can be determined, for example, by measuring a current transmitted at the sliding piece. Furthermore, an illuminance or a light density can be measured in the area of the contact line, meaning the presence of an electric arc can be determined with high certainty from both measured values when measured peaks occur simultaneously. Since the contact line is commonly disposed in a zigzagging course along a route, the zigzagging course of the contact line can also be determined, for example by means of acceleration sensors and/or inductive sensors. It thus also becomes possible to generate a profile of the overhead contact line along the route. The profile of the overhead contact line can be stored in the evaluation unit in the form of a map of the overhead contact line and/or in the form of the course of the contact line. Possible defects detected at the overhead contact line and/or at the contact line can then be precisely associated with unequivocally specifiable points of the overhead contact line. A plurality of sensors and/or measured values can also detect whether the contact line is frozen over, for example by measuring outdoor temperatures or the air humidity in the area surrounding the contact line. Thus, areas or rather track sections of the overhead contact line along the route can be yielded where it is more or less likely that the contact line is frozen over, for example around bodies of water. These data can also be stored in the evaluation unit. Moreover, defects of the contact line and/or the overhead contact line can be detected using sensors, for example an acceleration sensor can detect a collision acting on the sliding piece as a result of a defect of the contact line and a changing pressing force having a pressure sensor at the same time. Overall, it becomes possible to draw conclusions on an operating state of the overhead contact line via a combination of several measured values from sensors of the same or different make and to document this operating state in the form of characteristic values and/or other data which are suitable for describing the operating state. For this purpose, a test run intended in particular for this scenario is not required as the measured values can be easily and repeatedly registered during regular operation.

The processing apparatus or the evaluation unit can perform a sample analysis or statistical evaluation of the measured values and/or characteristic values stored over a period of time and can derive a characteristic from the sample analysis or the statistical evaluation. It thus becomes possible to detect an operative relationship between measured values, characteristic values and datasets via the sample analysis, provided this operative relationship is available. Causal connections can often be derived from operative relationships. Correlations discovered via the sample analysis can be used for detecting causal connections in the simplest embodiment of the method, the knowledge of these causal connections in turn being able to be used for optimizing an operation of rail vehicles. For instance, a defect occurring in a track section of an overhead contact line can correlate with a specific type of rail vehicle or current collector. This makes it possible to detect a cause for the defect or operative relationship between the rail vehicle and the defect and to alleviate it in a targeted manner. If a sufficient amount of data is available, they can be inspected by means of a statistical evaluation to ensure that the events are not coincidentally detected events, for example. Nevertheless, it is possible to calculate a weighting, for example of a defect, or the frequency of an event and the probability of the defect occurring via the statistical analysis.

The processing apparatus or the evaluation unit can put the measured values of different sensors and/or the characteristic values into correlation with each other and derive the functional dependencies of the measured values and/or the characteristic values by means of artificial intelligence. It can also be intended to perform the sample analysis by means of artificial intelligence. The artificial intelligence can be used within the scope of deep learning or a classification of data, for example. Thus, functional dependencies of the sensors among each other can be inspected. For instance, a transmitted current can be put into correlation with a temperature, whereby it could be detected that a contact line is frozen over. Hence, a series of other operating states and events can be detected and interpreted in consequence of functional dependencies, for example an alteration along a contact line and its relative position, an inclination and number, a lifting of the sliding piece from the contact line and, if applicable, forming sparks or electric arcs, wear of the sliding piece as a result of mechanical friction on the contact line and/or electric consumption as a result of a pressure or rather a pressing force, in particular an average wear over a distance, track sections having particularly high or particularly little wear, a wear rate depending on driving style, such as acceleration or standstill current load, damage and/or position deviations from the overhead contact line and/or contact line, a current load, such as momentary overcurrent, short-circuit current, triggering of fuses or a short-circuiting device in the event of a fault, a state of wear components of the current collector, such as bearings, joints, structural elements, breakage of the sliding piece, such as as a result of collision on an obstacle, a position, speed, acceleration and direction of travel of the rail vehicle. Suitable reactions to these exemplarily mentioned states and events can correspondingly be servicing measures, adaptation of the driving style of the rail vehicle or other suitable measures.

It can also be intended that the processing apparatus puts signals and/or measured values from sensors not associated with the current collector and/or characteristic values are into correlation with signals and/or measured values from sensors associated with the current collector and/or characteristic values, for instance via additionally taking signals and/or measured values and/or characteristic values from sensors of a ground contact, flange oiler, wave ground etc. into account. In general, it is also possible to process all signals and/or measured values detectable at the rail vehicle in this manner using the processing apparatus.

By means of the position sensor of the sensor apparatus, a position of the current collector can be detected, the position being able to be associated with the characteristic values or the measured values of another sensor of the sensor apparatus, the evaluation unit being able to determine a state of the overhead contact line. The position sensor can determine a position of the current collector and thus the vehicle via satellite navigation, for example. Thus, it can be established, among other things, where on a route a certain measured value of a different sensor of the sensor apparatus has been registered. This allows associating the specific position with an event and/or measured value. Moreover, it is possible to determine the state of the overhead contact line by means of the evaluation unit, for example by evaluating vibrations of the current collector and/or a rocker along the overhead contact line. Thus, the rocker can have a changed vibration behavior if the contact line is strongly worn. Ledges, interruptions and ramps can also be detected on the contact line and be associated with a position on the route. This allows impacting a speed of the rail vehicle in the thus localized track sections of the route.

The evaluation unit can generate a data model of the overhead contact line along at least one track section of a route of the rail vehicle, the data model being able to comprise a plurality of different positions of the track section having correspondingly associated measured values and/or characteristic values. The data model can be stored in the evaluation unit and comprise a sequence of data and/or files describing the overhead contact line. The data model can be a graphic rendition or mapping of the course of the overhead contact line along the route or a list, which comprises components of the overhead contact line, for example, in a simpler embodiment. The data model can have the plurality of different position of the track section in question and/or the route as corresponding datasets, meaning the structural properties of the overhead contact line are rendered by the data model. Positions or datasets can be associated with measured values and/or characteristic values in each instance. Consequently, the data model can, for example, comprise information on a zigzagging course of the contact line together with the length of the corresponding straight sections of the contact line. This zigzagging course can be associated with a position or track length of the route, in relation to a reference point. If measured values are determine by means of sensors or if characteristic values are determined by means of the processing apparatus, they can be associated with a position of the corresponding track section, provided the position is known or has been detected for the measurement in question. Possible events or defects in conjunction with the overhead contact line can be documented and be precisely found on site, if required, for example for servicing, because the position is known.

Furthermore, the data model can be adapted by continuously and repeatedly registering measured values and/or characteristic values when the rail vehicle runs along the track section. It can thus be intended that a route is repeatedly traversed with a current collector according to the invention or several of these current collectors on one or multiple rail vehicles. If measured values and/or characteristic values are registered in each instance for this purpose, the data model stored in the evaluation unit can be improved by continuously comparing these values. For instance, one-time events are identified as such and will not be taken into account, while frequently recurring events suggest a particular property or a problem with the overhead contact line or the current collector or the rail vehicle at a certain position. Continuously adapting the data model also allows documenting a use intensity and a correlated wear, which enables improved planning of servicing measures and maintenance. Continuously adapting the data model can also be used for determining the position such that the position of a current collector takes place via the data obtained from the current collector during a run and its comparison to the data model.

Furthermore, a measuring unit can be used which is formed on the current collector independently of the rail vehicle. The measuring unit can be disposed on or integrated in the current collector so as to be spatially and/or functionally independent of the rail vehicle. It is thus not a prerequisite for the measuring unit and the rail vehicle to be connected. In particular, the measuring unit also does not have to be connected to a low-voltage network of the rail vehicle. The measuring unit and consequently the current collector are usable independently of the type of rail vehicle and without a specific certification of a producer of the rail vehicle. Nevertheless, it is optional for the measuring unit to be connected to the rail vehicle, for example an operator's stand of the rail vehicle, in order to signal measured values and/or characteristic values to a vehicle conductor. In particular, data can be exchanged bidirectionally between the measuring unit and the rail vehicle. Consequently, wear, for example, can be signaled in an operator's stand or available measured data of the rail vehicle, such as speed, can be processed in the operator's stand by the measuring unit. Preferably, however, the measuring unit can be used independently of the rail vehicle.

The characteristic value can be determined during operation of the rail vehicle when the sliding piece abuts against the contact line, the characteristic value being able to be determined alternatively or additionally during standby operation of the rail vehicle, the sliding piece being able to be positioned in a resting position or being able to be moved between a contact position on the contact line and the resting position on the rail vehicle. The characteristic value is then determinable only based on the measured values registerable in the resting position. When separating the sliding piece from the contact line or when moving the sliding piece from the resting position on the rail vehicle toward the contact line, vibrations are induced in the sliding piece which can essentially vibrate without being impacted by outer influences. This makes it possible, for example, to use the vibration to determine the state of wear.

The current collector according to the invention is disposed on a roof of a rail vehicle and serves for transferring energy from a contact line of an overhead contact line to the rail vehicle, the current collector comprising a positioning device having a sliding piece disposed thereon, the positioning device being formed such that the sliding piece is moveable relative to the contact line by means of the positioning device and is pressed against the contact line in a sliding contact position using a pressing force, the positioning device having a drive mechanism and a spring mechanism by means of which the pressing force is produced on the sliding piece, the current collector having a measuring unit having a measuring device, at least two sensors of a sensor apparatus of the measuring device being disposed on the positioning device and/or the sliding piece, measured values being registered in the sliding contact position in each case by means of the sensors, the measured values being processed by means of a processing apparatus of the measuring device, the measured values being put into correlation with each other by means of the processing apparatus and a characteristic value describing an operating state of the current collector and/or the overhead contact line being determinable. With regard to the advantages of the current collector according to the invention, reference is made to the description of advantages of the method according to the invention.

Further advantageous embodiments of a current collector are derived from the descriptions of features of the dependent claims referring to device claim 1.

The monitoring system according to the invention comprises a plurality of rail vehicles each having at least one current collector according to the invention, the monitoring system comprising an evaluation unit for processing measured values and/or characteristic values of the measuring units of several current collectors. As previously described, this allows monitoring several current collectors of a rail vehicle or several rail vehicles having current collectors and/or to control the corresponding current collectors using a single evaluation unit. Nevertheless, it can be intended for each current collector to have an evaluation unit. The rail vehicles can also each have a plurality of current collectors. Overall, it thus becomes possible to collect and evaluate datasets of the current collectors, independently of the type of data connection, using the monitoring system. The monitoring system can also have an evaluation unit which is spaced apart from the current collectors and/or rail vehicles and can be disposed in a fixed manner outside of and away from the rail vehicle, for example in a building. For instance, correlations between a position, a registration time and, if applicable, detected defects of the current collectors can be derived via the data stored in the evaluation unit; for example comparatively increased wear or a specific defect at the current collector or the overhead contact line can be associated with a season or a route.

The monitoring system can comprise one or a plurality of user units, which are spaced apart from each other. The data connection(s) with the corresponding user units can be established via an external data network. The user unit can be a computer which is independent of the monitoring system. This computer can be a stationary computer, a mobile radio system or the like, by means of which the data connection for exchanging data with the monitoring system can be established. The data can be exchanged via an external data network, such as the Internet, for example. Thus, data prepared using the evaluation unit can be made available to an extended user circle via an output device. The output device can be formed by a server using a software application, which transmits the results calculated by the evaluation unit and the information contained in the databank to the corresponding user unit. This transmission can take place by providing a web page having selected information, such as a current overview of stock of current collectors, overhead-contact-line routes and rail vehicles. The information can be provided to companies running rail vehicles in a manner that suits their needs.

Further advantageous embodiment of a monitoring system are derived from the descriptions of features of the dependent claims referring to device claim 1.

BRIEF DESCRIPTION OF THE DRAWINGS

In the following, the invention is described in more detail with reference to the attached drawings.

DETAILED DESCRIPTION

Figure 1:
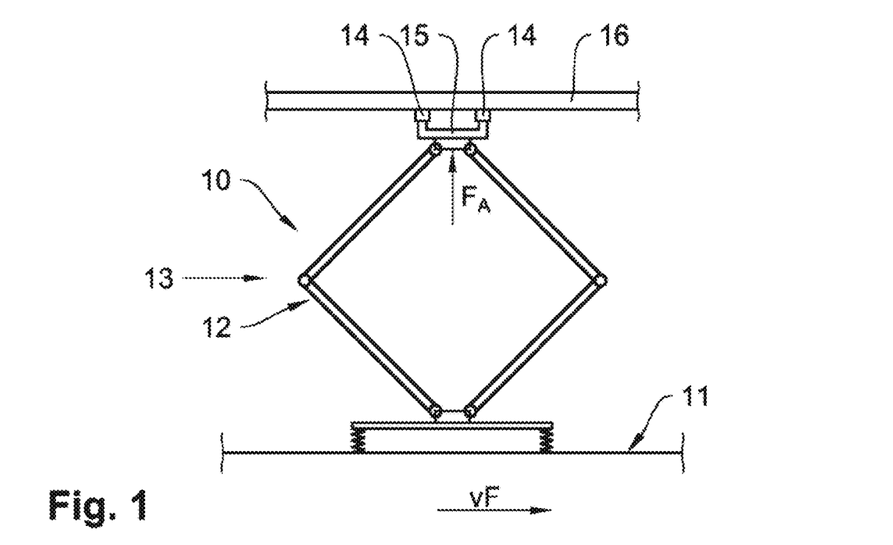
FIG. 1 shows a side view of a current collector on a rail vehicle.

FIG. 1 shows a current collector 10 on a roof 11 of a rail vehicle (not illustrated) having a positioning device 13 formed as a pantograph 12. On pantograph 12, two sliding pieces 14 are disposed on a rocker 15 perpendicular to a contact line 16. The rail vehicle moves in relation to contact line 16 at a speed VF, sliding pieces 14 being pressed against contact line 16 perpendicularly and/or orthogonally to contact line 16 using a pressing force FA. Sliding piece 14 is made of a carbon contact element (not illustrated) and a sliding piece holder, the described movement of sliding piece 14 on contact line 16 causing an abrasion of the carbon material.

Figure 2A:
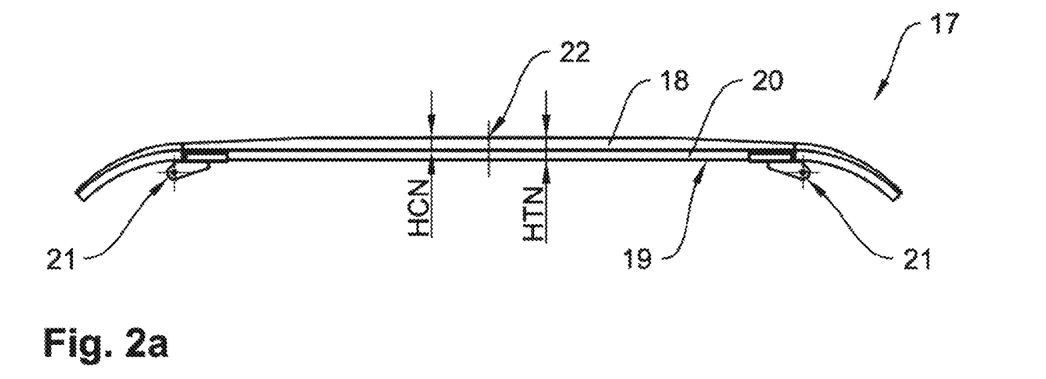
FIG. 2a shows a front view of an unused sliding piece.
Figure 2B:
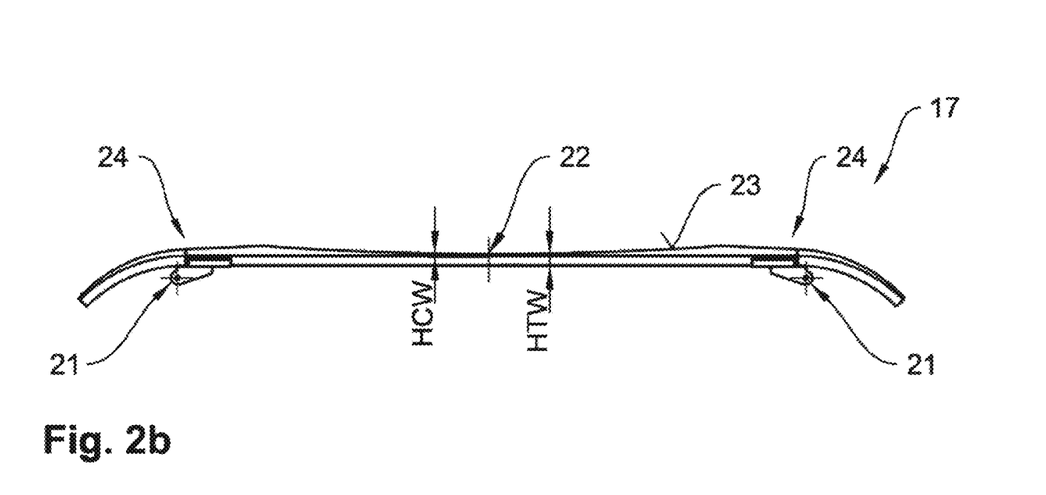
FIG. 2b shows a front view of the worn sliding piece.

A combined view of FIGS. 2a and 2b shows a sliding piece 17 in different views and states of wear. Sliding piece 17 is essentially made of a contact element 18, which consists of carbon or rather graphite and is formed by a sliding piece holder 19. Sliding piece holder 19 has a profile 20, which commonly consists of aluminum, on which contact element 18 is mounted. Mounting bearings 21 are formed on profile 20 and serve for connecting sliding piece 17 to a positioning device (not illustrated).

FIG. 2a shows sliding piece 17 in a new, i.e., unused, state, meaning a height HCN of contact element 18 and/or HTN of sliding piece 17 is not changed or rather has a maximum value in the area of a center 22 of sliding piece 17. In the area of mounting bearings 21 and center 22, acceleration sensors (not illustrated) of a sensor device of a measuring system are disposed.

FIG. 2b shows sliding piece 17 in a used state of wear, meaning a height HCW of contact element 18 and/or a height HTW of sliding piece 17 in the area of center 22 is significantly reduced due to an abrasion of a surface 23 of contact element 18. This results in a changed vibration behavior of sliding piece 17, since a resisting torque and/or a mass of sliding piece 17 is changed or reduced. In the area of center 22, an abrasion of contact element 18 is the most pronounced as a contact line (not illustrated) has a zigzagging course and brushes sliding piece 17 on surface 23 while alternating between outer ends 24 of contact element 18 and surface 23 during a run of the rail vehicle.

Figure 3:
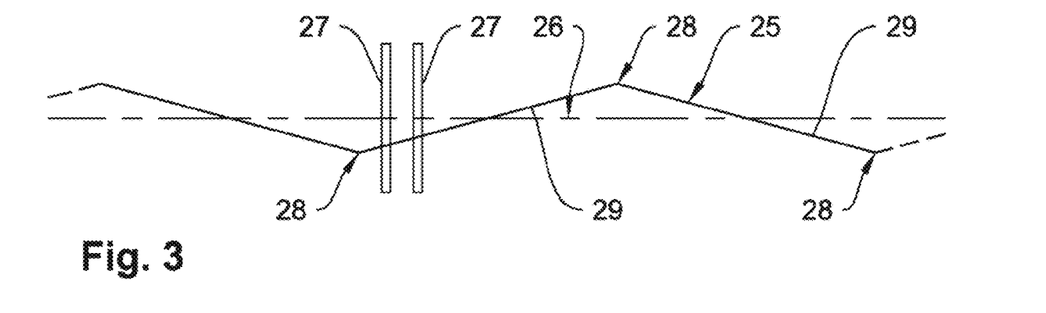
FIG. 3 shows a schematic view of a section of a route of a contact line.

FIG. 3 shows a schematic view of a contact line 25 in relation to a route 26 and sliding pieces 27 of a current collector (not illustrated) of a rail vehicle. Contact line 25 shown in sections forms a zigzagging course in relation to course 26. An overhead contact line (not illustrated) is realized such that the contact line is held at mounting points 28 of the overhead contact line. Contact line 26 extends in essentially straight sections 29 between mounting points 28. During a run of the rail vehicle along route 26, contact line 25 brushes sliding pieces 27 in alteration along its length. The current collector is equipped with a measuring unit having a measuring device and at least two sensors of a sensor apparatus of the measuring device. By means of the sensors, vibrations of sliding pieces 27 can be registered and these measured values can be processed and set into correlation with each other using a processing apparatus of the measuring device. The processing apparatus can determine and/or calculate an operating state of the overhead contact line and/or a zigzagging course of contact line 25 therefrom.

Figure 4:
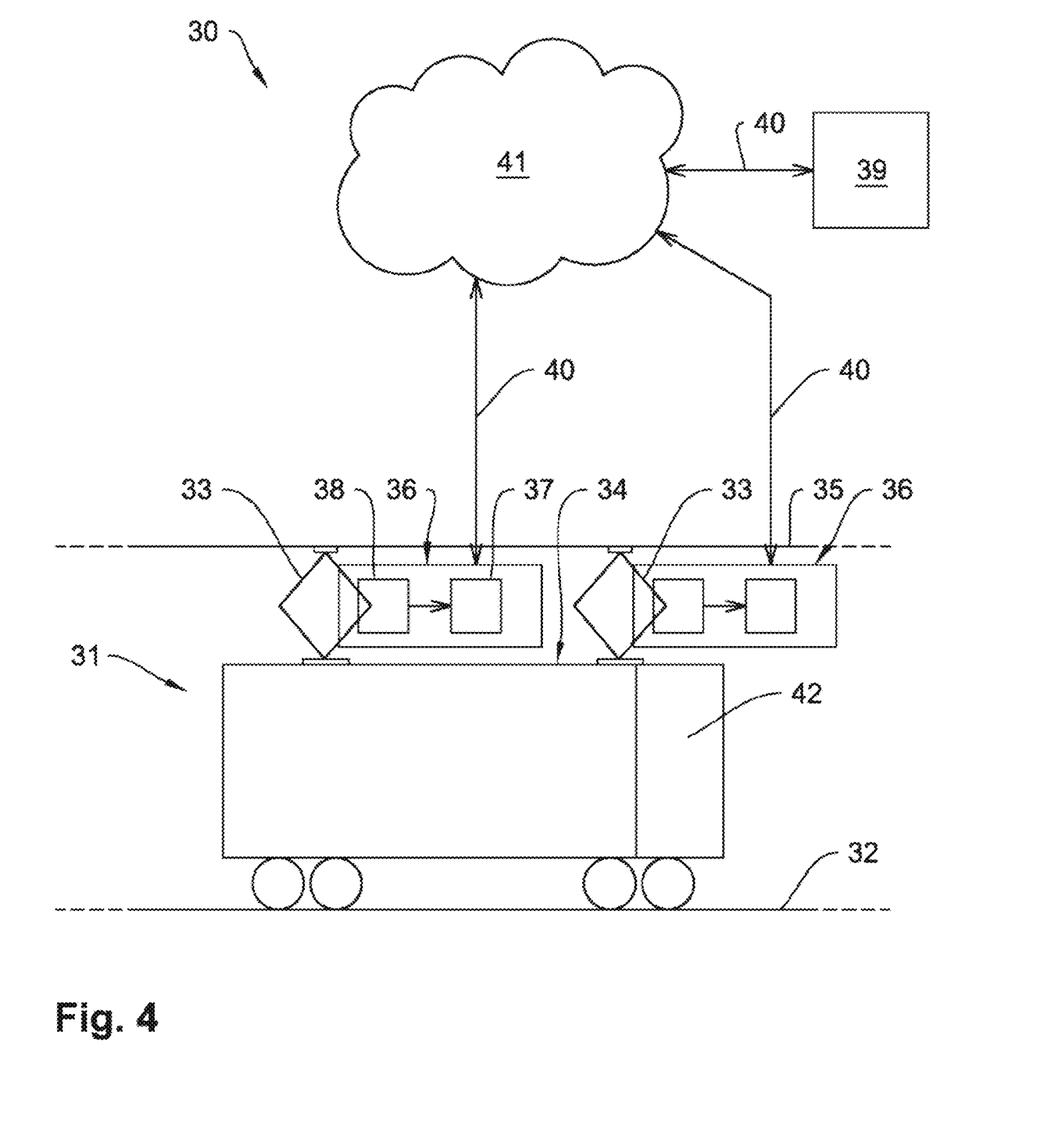
FIG. 4 shows a schematic view of a monitoring system together with a rail vehicle.

FIG. 4 shows a schematic view of a monitoring system 30 in conjunction with a rail vehicle 31. The rail vehicle runs on a track 32 and has current collectors 33 on a roof 34 of rail vehicle 31, current collectors 33 being able to be contacted with a contact line 35. Monitoring system 30 comprises a plurality of measuring units 36 on current collectors 33 each having a processing apparatus 37 and a measuring device 38. The monitoring system further comprises an evaluation unit 39, which receives, stores and processes datasets from measuring units 36. Evaluation unit 39 can analyze the datasets and output a result of the analysis. Measuring units 36 are connected to evaluation unit 39 via an external data network 41 via data connections 40, by means of which datasets are transmitted via radio signals. In this case, the datasets can be transmitted bidirectionally. Processing apparatus 37 register measured values at current collectors 33 from measuring unit 36 or sensors (not shown), put the measured values into correlation with each other and determine an operating state of current collector 33 or contact line 35 as a result. This result is transmitted to evaluation unit 39, as previously described. In general, a connection between measuring units 36 and external data network 41 via one data connection is possible and sufficient. Optionally, it is also possible to circumvent external data network 41, i.e., exchange datasets directly between measuring units 36 and evaluation unit 39. Measuring units 36 can also be connected to an operator's stand 42 of rail vehicle 31 such that the results and/or measured values of processing apparatus 37 can be displayed to a vehicle conductor in operator's stand 42.

Figure 5:
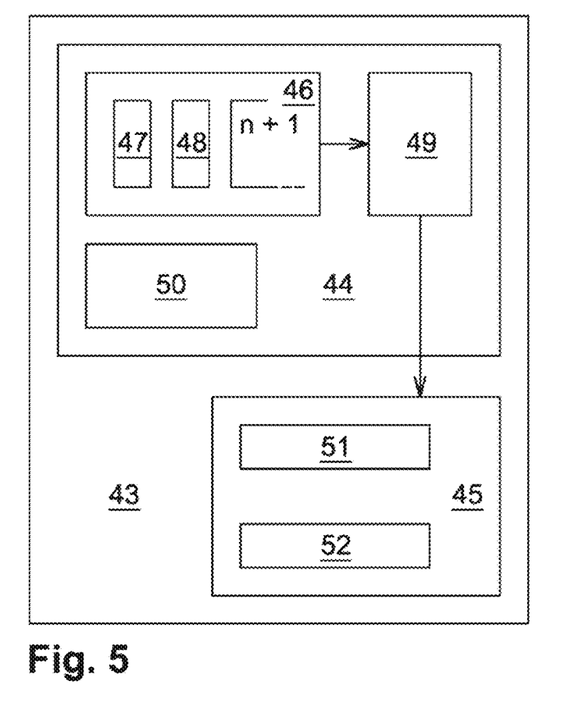
FIG. 5 shows a schematic view of a first embodiment of a measuring unit.

FIG. 5 shows a schematic view of a first embodiment of a measuring unit 43. Measuring unit 43 is made of a measuring device 44 and further comprises an evaluation unit 45. Measuring device 44 itself comprises a sensor apparatus 46 having a plurality of sensors 47, 48 and a processing apparatus 49. In addition, a supply apparatus 50 is provided, by means of which measuring device 44 is supplied with electric power. Supply apparatus 50 can be an energy storage, a generator or an external power supply, e.g., via a rail vehicle or a contact line. Evaluation unit 45 has a databank 51 and an evaluation device 52 and receives data or rather measured values and/or characteristic values from processing apparatus 49. Processing apparatus 49 receives measured values from sensors 47, 48 of sensor device 46 and processes these. The measured values pertain to operating parameters and/or physical measured variables of a pressing device of a current collector (not illustrated) of the type exemplarily shown in FIG. 1. Processing apparatus 49 processes the measured values such that it puts them into correlation with each other and it detects a characteristic value describing an operating state of the corresponding current collector and/or overhead contact line. Each detected characteristic value is continuously or gradually transmitted to evaluation unit 45 by processing apparatus 49 and stored in databank 51 and/or processed and/or prepared using evaluation apparatus 52.

Figure 6:
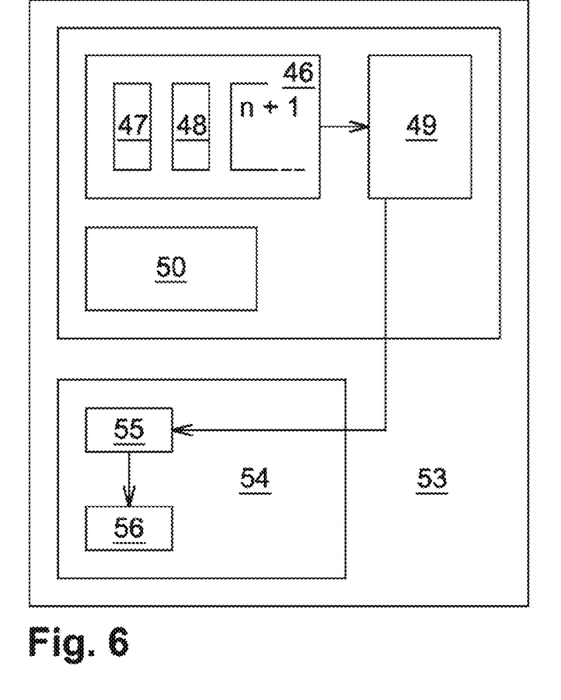
FIG. 6 shows a schematic view of a second embodiment of a measuring unit.

FIG. 6 shows another measuring unit 53, in which the processing apparatus 49 transmits data to a control device 54 in contrast to the measuring unit from FIG. 5. Control device 54 is made of a regulating apparatus 55 and a positioning device 56, regulating apparatus 55 regulating an actuator (not illustrated) of positioning device 56 as a function of the transmitted data. Consequently, a pressing force of a sliding piece of a current collector, which comprises positioning device 56, are regulated by means of regulating device 55 such that a lifting of the sliding piece is essentially prevented by a power bus.

Figure 7:
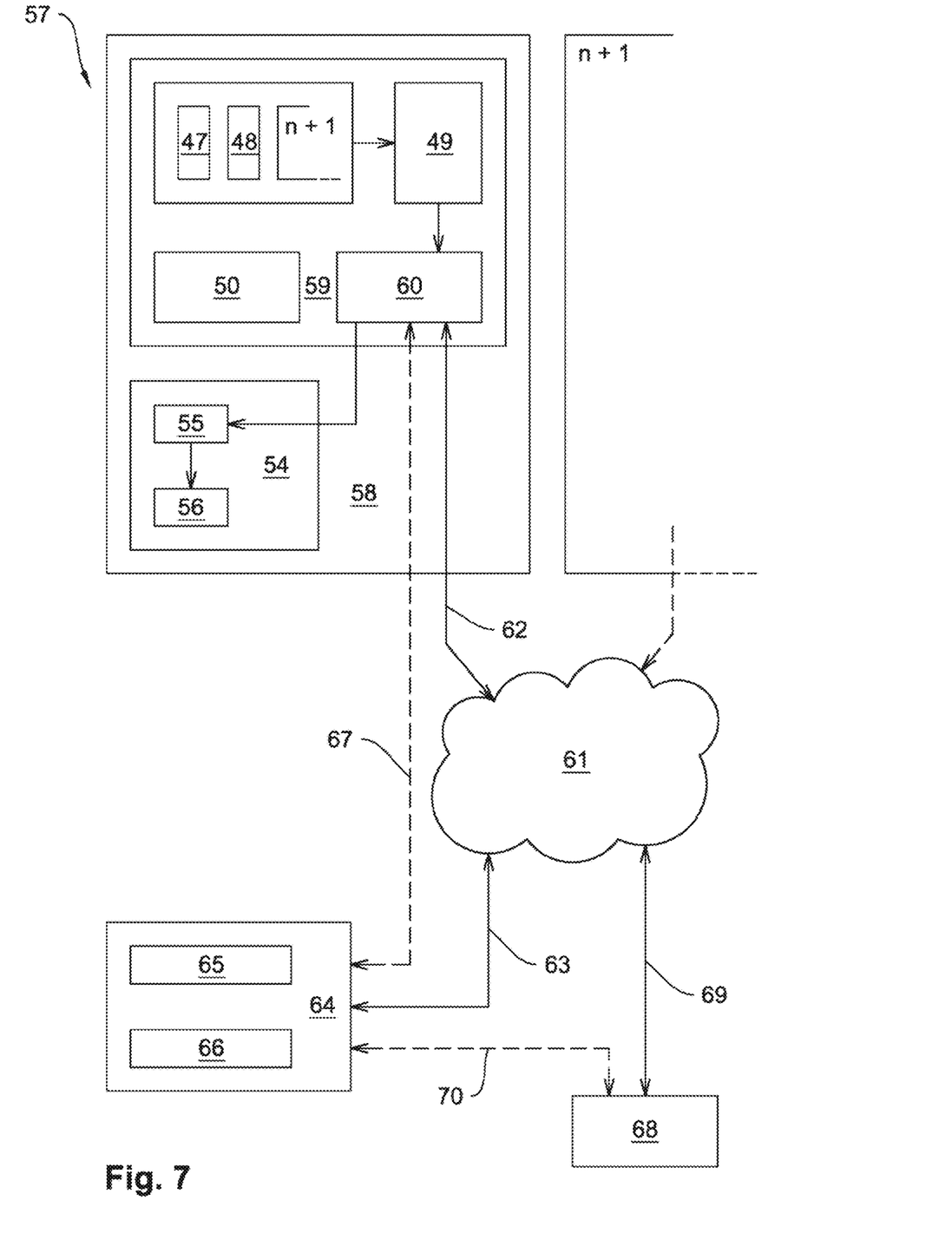
FIG. 7 shows a schematic view of another monitoring system.

FIG. 7 shows a monitoring system 57 having a measuring unit 58. Monitoring system 57 can have a plurality of measuring units 58. Measuring unit 58 has, in contrast to the measuring unit from FIG. 6, a measuring device 59 which comprises a transmitting apparatus 60. Transmitting apparatus 60 receives data or rather measured values and/or characteristic values from processing apparatus 49 and transmits these to control device 54. Furthermore, a data connection 62 exists between transmitting apparatus 60 and an external data network 61, measured values and/or characteristic values being transmitted via radio signals by means of data connection 62. Via another data connection 63, an evaluation unit 64 having a databank 65 is connected to external data network 61 and an evaluation device 66 and exchanges data or rather measured values and/or characteristic values with transmitting apparatus 60 via external data network 61. In general, it is also possible to circumvent external data network 61, i.e., to directly exchange these data via a direct data connection 62. Moreover, a user unit 68 is provided which is connected to another data connection 69 having external data network 61. User unit 69 can thus exchange data with evaluation unit 64, i.e., data of measuring units 58 prepared by evaluation unit 64 can be output and displayed via user unit 68 and be provided for further use. User unit 68 can also be directly connected to evaluation unit 64 via a direct data connection 70. Overall, it is thus possible to obtain measured values via sensors 47, 48 mounted on current collectors (not illustrated) and to use these for directly controlling and/or regulating the corresponding current collector by means of control device 54. Furthermore, these data can be transmitted to evaluation unit 64 for storage and evaluation via external network 61, for example via the Internet. Functional relationships of the data can thus be used, evaluated and interpreted. The results of these evaluations can be made available to an end user via user unit 68.

The invention claimed is:

1. A method for operating a current collector (10, 33), which is disposed on a roof (11, 34) of a rail vehicle (31), for transferring energy from a contact line (16, 25, 35) of an overhead contact line to the rail vehicle, the current collector comprising a positioning device (13, 56) having a sliding piece (14, 17, 27) disposed thereon, the positioning device moving the sliding piece relative to the contact line and pressing it against the contact line in a sliding contact position using a pressing force in order to establish a sliding contact, the pressing force being produced on the sliding piece by means of a drive mechanism and a spring mechanism of the positioning device, wherein the current collector has a measuring unit (36, 43, 53, 58) having a measuring device (38, 44, 59), at least two sensors (47, 48) of a sensor apparatus (46) of the measuring device being disposed on the positioning device or the sliding piece, measured values being registered in the sliding contact position in each case by means of the sensors, the measured values being processed by means of a processing apparatus (37, 49) of the measuring device, the method comprising, via the processing apparatus, putting the measured values into correlation with each other and determining a characteristic value describing an operating state of the current collector or the overhead contact line.

2. The method according to claim 1, wherein an angular position of the positioning device (13, 56), an acceleration, a frequency, a temperature, an illuminance, a force, a current, a voltage, an electric resistance, a distance, a mass, an air pressure, a sound, wear or a position are continuously or discontinuously registered and processed as measured values.

3. The method according to claim 1, wherein at least one acceleration sensor is used as a sensor (47, 48), the acceleration sensor being disposed on the sliding piece (14, 17, 27) or on the positioning device (13, 56).

4. The method according to claim 1, wherein at least one sensor (47, 48) is used which is disposed within the sliding piece (14, 17, 27), on the sliding piece, on a mounting bearing (21) of the sliding piece or on a rocker of the positioning device (13, 56) holding the sliding piece.

5. The method claim 1, wherein the processing apparatus (37, 49) performs an analysis of the measured values while the sliding piece (14, 17, 27) is guided along the contact line (16, 25, 35).

6. The method according to claim 1, wherein the processing apparatus (37, 49) registers and stores the measured values of the sensors (47, 48) and/or the characteristic values in regular intervals, when change occurs or continuously.

7. The method according to claim 1, wherein an actuator for actuating the positioning device (13, 56) is controlled by means of a control device (54) of the measuring device (38, 44, 59), the actuation of the positioning device being regulated by means of regulating apparatus (55) of the control device according to a measured value or a characteristic value.

8. The method according to claim 7, wherein the pressing force is regulated by the regulating apparatus (55) as a function of the measured values or the characteristic values.

9. The method according to claim 1, wherein the measuring device (38, 44, 59) transmits the measured values or the characteristic values to an evaluation unit (39, 45, 64), the measured values or the characteristic values being stored in a databank (51, 65) of the evaluation unit or being further processed by means of an evaluation device (52) of the evaluation unit.

10. The method according to claim 9, wherein the measured values or the characteristic values of the measuring device are transmitted to the evaluation unit (39, 45, 64) or the control device (54) via a data connection (40, 62, 63, 67, 69, 70) by means of a transmitting apparatus (60) of the measuring device (38, 44, 59), the evaluation unit or the control device being spaced apart from the measuring unit (36, 43, 53, 58) or being integrated in the measuring unit.

11. The method according to claim 10, wherein the data connection (40, 62, 63, 69) is established via an external data network (41, 61).

12. The method according to claim 9, wherein the evaluation unit (39, 45, 64) processes measured values or characteristic values of measuring units (36, 43, 53, 58) of several current collectors (10, 33).

13. The method according to claim 9, wherein a data connection (40, 62, 63, 67, 69, 70) with the evaluation unit (39, 43, 53, 58) or the measuring unit is established by means of a user unit (68), the measured values or the characteristic values being transmitted and output to the user unit.

14. The method according to claim 9, wherein the processing apparatus (37, 49) or the evaluation unit (39, 45, 64) evaluates a temporal sequence of the measured values or the characteristic values and determines a state of wear of the current collector (10, 33) or the overhead contact line while taking a time-dependent component relevant for wear or a component dependent on a measured variable into consideration.

15. The method according to claim 9, wherein a vibration of the sliding piece (14, 17, 27) is registered by means of the sensor apparatus (46), the processing apparatus (37, 49) or the evaluation unit (39, 45, 64) determining a state of wear of the sliding piece or the overhead control line.

16. The method according to claim 9, wherein the processing apparatus (37, 49) or the evaluation unit (39, 45, 64) determines the following as an operating state: an electric arc at the sliding piece (14, 17, 27) or the contact line (16, 25, 35), a zigzagging course of the contact line, a frozen over contact line or defects of the contact line.

17. The method according to claim 9, wherein the processing apparatus (37, 49) or the evaluation unit (39, 45, 64) performs a sample analysis or statistical evaluation of the measured values or characteristic values stored over a period of time and derives a characteristic number from the sample analysis or the statistical evaluation.

18. The method according to claim 9, wherein the processing apparatus (37, 49) or the evaluation unit (39, 45, 64) puts the measured values of multiple sensors (47, 48) and/or the characteristic values into correlation with each other and derives functional dependencies of the measured values/or the characteristic values by means of artificial intelligence.

19. The method according to claim 9, wherein a position of the current collector (10, 33) is determined by means of a position sensor of the sensor apparatus (46), the position being associated with the characteristic values or the measured values of another sensor (47, 48) of the sensor apparatus, the evaluation unit (39, 45, 64) determining a state of the overhead contact line.

20. The method according to claim 9, wherein the evaluation unit (39, 45, 64) generates a data model of the overhead contact line along at least one track section of a route (26) of the rail vehicle (31), the data model comprising a plurality of different positions of the track section having correspondingly associated measured values or characteristic values.

21. The method according to claim 20, wherein the data model is adapted by continuously and repeatedly registering measured values or characteristic values during runs of the rail vehicle (31) along the track section.

22. The method according to claim 1, wherein a measuring unit (36, 43, 53, 58) is used which is formed on the current collector (10, 33) independently of the rail vehicle (31).

23. The method according to claim 1, wherein the characteristic value is determined during an operation of the rail vehicle (31) when the sliding piece (14, 17, 27) abuts against the contact line (16, 25, 35), the characteristic value being determined alternatively or additionally during stationary use of the rail vehicle, the sliding piece being positioned in a rest position or being moved between a contact position on the contact line and the rest position on the rail vehicle.

24. A current collector (10, 33), the current collector being disposed on a roof (11, 34) of a rail vehicle (31) and serving for transferring energy from a contact line (16, 25, 35) of an overhead contact line to the rail vehicle, the current collector comprising a positioning device (13, 56) having a sliding piece (14, 17, 27) disposed thereon, the positioning device being formed such that the positioning device moves the sliding piece relative to the contact line and presses it against the contact line in a sliding contact position using a pressing force, the positioning device having a drive mechanism and a spring mechanism by means of which the pressing force is produced on the sliding piece, wherein the current collector has a measuring unit (36, 43, 53, 58) having a measuring device (38, 44, 59), at least two sensors (47, 48) of a sensor apparatus (46) of the measuring device being disposed on the positioning device or the sliding piece, measured values being registerable in the sliding contact position in each case by means of the sensors, the measured values being processed by means of a processing apparatus (37, 49) of the measuring device, the processing apparatus putting the measured values into correlation with each other and determining a characteristic value describing an operating state of the current collector or the overhead contact line.

25. A monitoring system (30) having a plurality of rail vehicles (31) each having at least one current collector (10, 33) according to claim 24, the monitoring system comprising an evaluation unit (39, 45, 64) for processing measured values or characteristic values of the measuring units (36, 43, 53, 58) of several current collectors.

* * * * *